A. W. LIVINGSTON.
VEHICLE WHEEL HUB.
APPLICATION FILED MAY 7, 1912.

1,133,158.

Patented Mar. 23, 1915.

WITNESSES:
H. A. Stock
F. P. Schroeder

INVENTOR
ANDREW W. LIVINGSTON
BY
Harry C. Schroeder
ATTORNEY

UNITED STATES PATENT OFFICE.

ANDREW W. LIVINGSTON, OF OAKLAND, CALIFORNIA, ASSIGNOR TO STANDARD STEEL WHEEL AND TIRE ARMOR COMPANY, OF OAKLAND, CALIFORNIA, A CORPORATION OF ARIZONA.

VEHICLE WHEEL-HUB.

1,133,158.  Specification of Letters Patent.  Patented Mar. 23, 1915.

Original application filed September 25, 1911, Serial No. 651,200. Divided and this application filed May 7, 1912. Serial No. 695,778.

*To all whom it may concern:*

Be it known that I, ANDREW W. LIVINGSTON, a citizen of the United States, residing at Oakland, in the county of Alameda and State of California, have invented certain new and useful Improvements in Vehicle Wheel-Hubs, of which the following is a specification.

This invention relates to an improved type of hub which is used in connection with a wheel having a spoke structure formed from a blank which is crimped to form radial corrugations and forms a divisional application divided out of case bearing Serial No. 651,200.

This invention is illustrated in the accompanying drawings, wherein:—

Figure 1:
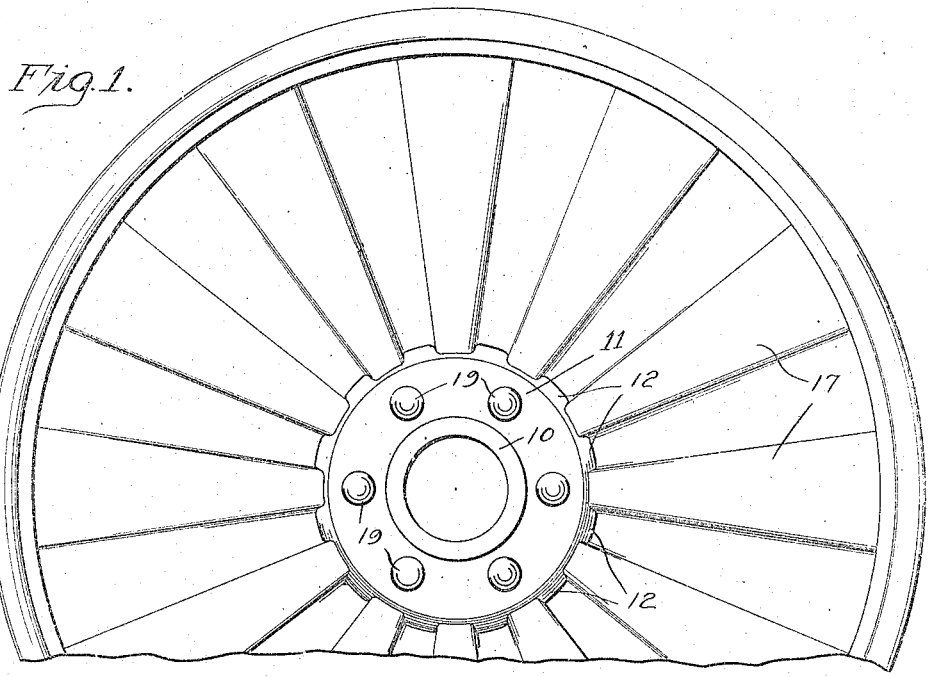
Figure 2:
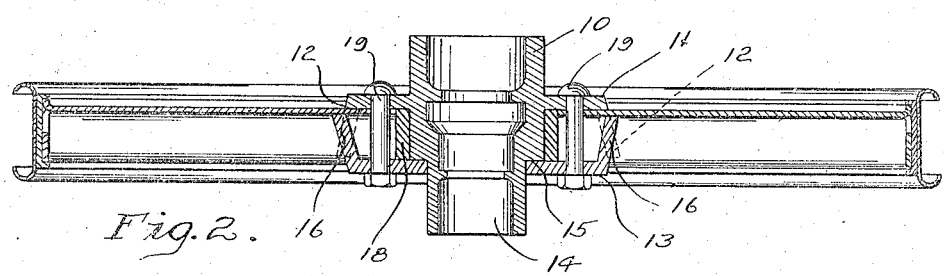
Figure 3:
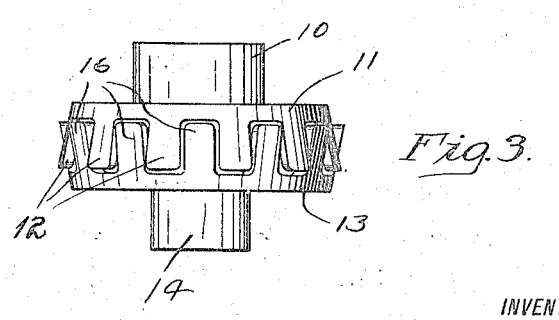

Figure 1 is a side elevation of a wheel provided with the improved hub. Fig. 2 is a transverse sectional view through the wheel. Fig. 3 is a side elevation of the hub.

Referring to the accompanying drawings, it will be seen that this invention comprises a hub 10 which carries a flange 11 from which there extends the fingers 12, the fingers being arranged in diverging relation so that they are flared as shown in Fig. 2. A plate 13 is fitted upon the reduced end 14, and fits against the shoulder 15 formed by the reduced end. This plate carries fingers 16 which are similar to the fingers 12, and pass between the fingers so that the spoke structure will be rigidly connected with the hub. This spoke structure is crimped to form the corrugations 17, and is provided with a central ring 18 which fits upon the hub between the flange 11 and the plate 13. When the spoke structure is pressed upon the hub, the fingers 12 fit between the corrugations 17 as shown in Fig. 1, and the plate 13 is then pressed upon the reduced end of the hub with its fingers 16 passing into the corrugations 17 and between the fingers 12. Bolts 19 are passed through the flange 11 and plate 13, and the securing nuts are tightened so that the spoke structure will be very securely clamped in position. It should be noted that the spoke structure is formed from resilient material so that when the bolts 19 are tightened the spoke structure will cause the plate to have a tendency to move away from the flange and thus create a nut lock securing the nuts of the bolts and thus preventing them from working loose.

Having thus described my invention, what I claim is:—

In a wheel the combination of a spoke structure formed from a disk provided with a central opening and having radiating corrugations extending from the central opening, a hub extending through the central opening of the spoke disk, a plate carried by said hub, fingers extending from said plate into the corrugations of said spoke structure, and extending into the corrugations of said plate in diverging relation, a plate mounted upon said hub upon the opposite side of said spoke structure from said first mentioned plate, fingers extending from said second mentioned plate into the corrugations of said spoke structure, said last mentioned fingers extending from said last mentioned plate in diverging relation and extending diagonally between the fingers of said first mentioned plate to interlock with the same, and means connecting said first and second mentioned plates to hold said hub and second mentioned plate secured to said hub structure.

In testimony whereof I affix my signature in presence of two witnesses.

ANDREW W. LIVINGSTON.

Witnesses:
W. A. STOCK,
F. P. SCHROEDER.